April 5, 1966 W. F. WANNER 3,244,195
CAPSULE-TYPE CHECK VALVE
Filed Sept. 26, 1963
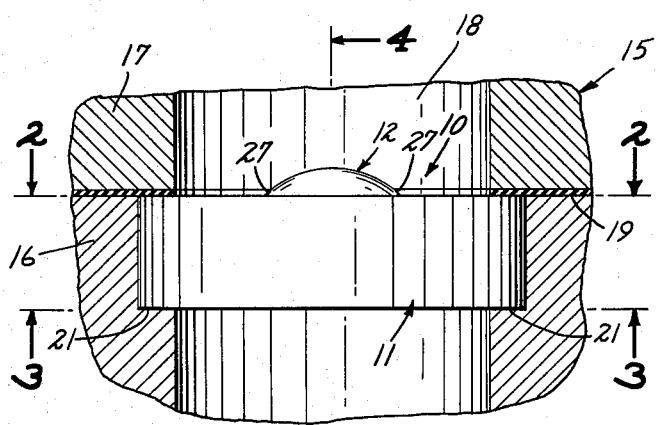
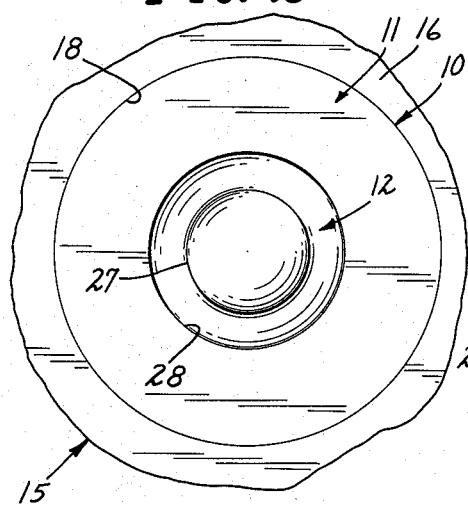 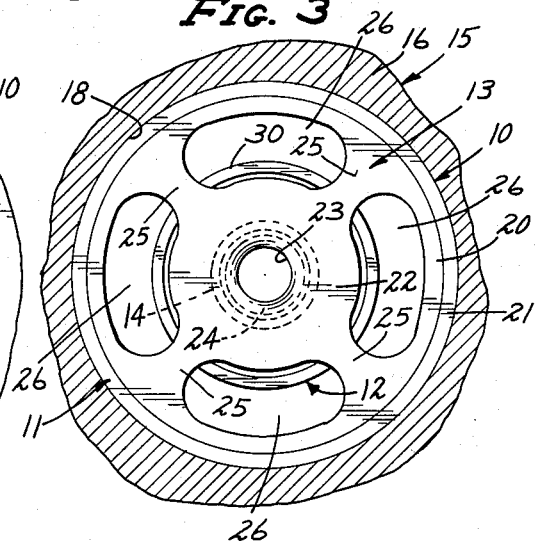
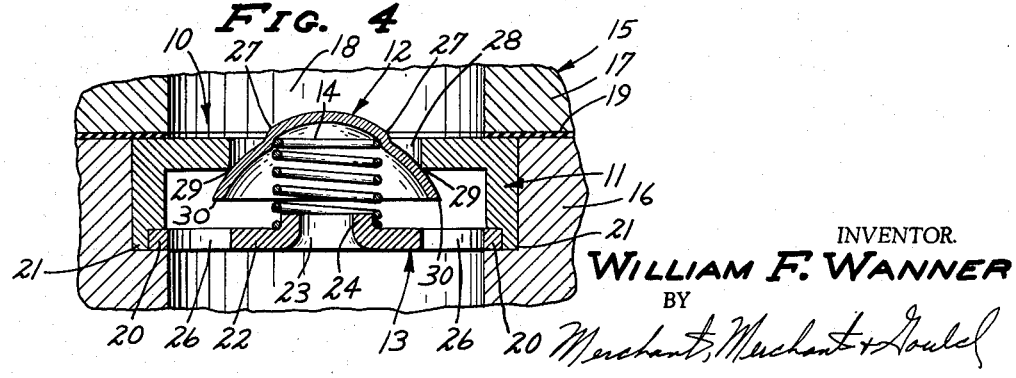
INVENTOR.
WILLIAM F. WANNER
BY
ATTORNEYS

United States Patent Office 3,244,195
Patented Apr. 5, 1966

3,244,195
CAPSULE-TYPE CHECK VALVE
William F. Wanner, Minneapolis, Minn., assignor to Seeger-Wanner Corporation, Minneapolis, Minn., a corporation of Minnesota
Filed Sept. 26, 1963, Ser. No. 312,832
8 Claims. (Cl. 137—543.17)

This application is a continuation-in-part of my co-pending United States application Serial No. 220,821, filed August 31, 1962, now abandoned, and entitled, "Capsule-Type Check Valve."

This invention relates to valves, and more particularly to a capsule-type check valve.

Still more particularly, this invention relates to a self-aligning, self-seating capsule-type check valve.

Principally, the invention contemplates a check valve in capsule form which may be conveniently mounted and sealed in place in a pipe, plate, or the like, as in a pump, check structure, or the like, to produce unidirectional liquid flow.

Specifically, the invention comprises a cup-shaped member having an axial fluid opening therethrough, a cup-shaped valve element having a convex outer surface adapted to close said axial fluid opening, a spider mounted in said cup-shaped member at the marginal portion thereof, and yielding means interposed between said spider and said valve element yieldingly urging said valve element into seating engagement with said axial fluid opening.

It is an object of this invention to provide an improved capsule-type check valve.

It is another object of this invention to provide a low inertia, self-aligning, self-seating, and even self-cleaning check valve structure.

It is another object of this invention to provide a capsule-type check valve which can be conveniently and simply made from three sheet metal stampings and a spring.

It is a further object of this invention to provide a stemless check valve mechanism in capsule form.

A feature of this invention resides in a valve construction which should the valve become injured by any cause, such as passage of foreign particles therethrough, to the point where leakage occurs, permits the valve to be removed in its entirety from a fluid passage and a new valve substituted therefor. In view of the fact that the valve of this invention can be relatively inexpensively produced, considerable time and effort is eliminated in valve replacement, particularly when it is considered that no valve seat refacing is necessary.

Other and further objects of this invention will become apparent to those skilled in the art upon the reading of the present specification taken in conjunction with the attached drawings in which;

FIG. 1 is a side elevational view mounted in position for use, parts thereof being broken away;

FIG. 2 is a horizontal sectional view taken along the line 2—2 of FIG. 1, parts thereof being broken away;

FIG. 3 is a horizontal view taken along the line 3—3 of FIG. 1, parts thereof being broken away;

FIG. 4 is a vertical section taken along the line 4—4 of FIG. 1, parts thereof being broken away and parts thereof being shown in section.

Referring to the embodiment of the invention illustrated, there is seen a capsule-type check valve structure herein designated in its entirety by the numeral 10 which is composed of three parts, to wit, a cup-shaped member 11, a cup-shaped valve element 12, a spider herein referred to in its entirety by the numeral 13, and a yielding or spring means 14. Cup-shaped member 11, cup-shaped valve element 12, and spider 13 all may be conveniently formed of sheet metal stamped into the proper shape by conventional metal working procedures.

The valve 10 is shown in FIG. 1 mounted in a housing 15 comprising a pair of sections 16 and 17 which cooperate to form a fluid passage 18. Between sections 16 and 17 is positioned a gasket 19 which, in the embodiment shown, is adapted to both seal sections 16 and 17 together and prevent fluid leakage around the capsule valve 10 in the housing 15. Conventional means securing sections 16 and 17 together are not shown. Instead of using a gasket 19, an O-ring seal can be employed conveniently, depending upon the needs of the particular use situation.

Spider 13 is composed of a rim portion 20 whose dimensions are conveniently made so as to permit spider 13 to seat, as by a pressure fit, across the marginal portion 21 of cup-shaped member 11. The hub portion 22 of spider 13 has a hole 23 formed at its axis. Conveniently, hole 23 is defined by an inturned flange 24. Hole 23 and flange 24 can be conveniently formed by a conventional stamping operation particularly when spider 13 is formed of metal. Spokes 25 of spider 13 connect hub portion 22 of spider 13 with the rim portion 20 of spider 13, thereby defining ports 26 for passage of fluid therethrough.

Flange 24 can be conveniently formed if hole 23 is formed by extruding. Ports 26 can be arranged to give whatever dampening effect is desired in the operation of the valve.

Cup-shaped valve element seats on its convex outer surface in axial fluid opening 28 axially located in the base of cup-shaped member 11. Preferably, cup-shaped valve element 12 is formed as a section of the surface of a sphere except for an axial generally cylindrical projection 27 that serves as a seat for one end of the spring means 14 to hold said one end of the spring means 14 against lateral or radial movement relative to the valve element 12. When cup-shaped valve element 12 is formed of metal, it can be conveniently drawn, in which event a cross-sectional view of the cup-shaped element 12 has the general appearance shown in FIG. 4, that is, the projection appears both on the convex outer surface and the concave inner surface of the cup-shaped valve element 12. Projection 27 is conveniently formed in the apex region of the drawn metal valve element 12.

When cup-shaped valve element 12 has a section of a hollow sphere, its mass is kept at a minimum, thereby requiring minimum acceleration and deceleration forces to change its movement. These same valve characteristics are responsible for the low impact forces on the valve element 12 and on the seat region 29 of the cup-shaped member 11.

As shown in FIG. 4, the axial projection 27 is of substantially smaller diameter than the fluid opening 28. The axial dimension of the valve element 12 and the axial dimension between the seat 29 and spider 22 are such that the projection 27 remains located in the opening 28 in all operating positions of the valve element 12.

The region in which the force of spring means 14 is exerted on valve element 12 is preferably beyond the plane of the seat 29, thereby enhancing the self-aligning feature of the valve 10.

The spherical convex surface of valve element 12 in the region where valve element 12 seats in fluid opening 28 (i.e., seat 29) produces almost a line contact between valve element 12 and cup-shaped element 11. As a consequence any suspended particles in the liquid being moved past the valve tend to be pushed off the region of seat 29 as the valve element 12 closes fluid opening 28. Furthermore, any suspended fibers lodged in the region of seat 29 tend to be cut through as the cup-shaped valve element 12 seats in fluid opening 28. Thus, the valve 10 has self-cleaning characteristics.

Dimensions of spring 14, axial hole 23 and inturned flange 24 are preferably chosen so that spring 14 will seat over flange 24 so as to fix, when valve element 12 is positioned upon spring 14, the relationship between cup-shaped member 11, valve element 12, and spider 13.

In the embodiment shown in the drawing, the suspension of the valve is such that it moves around in seating, thereby avoiding wear in a fixed ring on valve element 12.

In assembling the valve structure of the present invention, one first places the cup-shaped valve element 12 in position within the interior of the cup-shaped member 11. Then the spring means 14 and the spider are positioned in place in the manner shown in the drawing.

In the preferred embodiment of the invention, the distance between the axial fluid opening 28 of cup-shaped member 11 and spider 13 is such that when cup-shaped valve element 12 is positioned between these respective elements, spider 13, and particularly the spoke portion 25 thereof, angular displacement of cup-shaped valve member 12 from what could be considered its normal position wherein the apex of projection 12 is axially aligned within hole 23 is limited. In other words, should cup-shaped valve element 12 be canted, the preferably spherically convex surface of valve element 12 will still remain seated in fluid opening 28 along seat 29 even if lip 30 of valve element 12 touches spider 13.

While, in the foregoing description, a specific type of valve structure has been described, it is to be understood that such structure can be modified and that I intend to claim and cover in my claims any and all types of equivalent valve structures within the spirit and scope of my invention, as represented in the appended claims defining the same.

The claims are:
1. A self-aligning, self-seating check valve comprising:
 (a) a cup-shaped element having a base defining a valve seat an axial circular fluid passageway extending therethrough, said element being adapted to be mounted in a fluid passage,
 (b) a spider including a hub portion having at least one axially positioned inturned flange, a rim portion mounted in the marginal portion of said cup-shaped member, and spokes connecting the hub and rim portions and defining ports for liquid passage therethrough,
 (c) a cup-shaped valve element whose convex outer sides are spherically curved and whose apex is formed into an axial projection, the convex outer sides of said valve element being positioned within said cup-shaped member and adapted to normally engage valve seat to close said fluid opening, and
 (d) a compression spring urging said valve element into yielding engagement with the said valve seat to close said fluid opening and extending interiorly in said cup-shaped element between said inturned flange and the concave interior region of said valve element beyond the plane of the seating engagement of said valve element with said valve seat in said fluid passage, said spherically curved convex surface being arranged to engage said valve seat in predetermined angular displacements of said valve element relative to said seat and to project sufficiently into said opening such that the projection remains located in the opening in all operating positions of the valve.

2. A capsule-type check valve comprising:
 (a) a generally cup-shaped body adapted to be disposed in a fluid passage and having, a marginal edge, a transverse wall portion axially spaced from said marginal edge, said transverse wall portion and fluid opening defining a valve seat, and an axial fluid opening through said transverse wall portion,
 (b) a cup-shaped valve element disposed within said body and having a convex outer surface portion normally seating against said valve seat to close said opening and an axially projected apex portion,
 (c) a spider mounted in said body in spaced relation to said opening and valve element,
 (d) and yielding means interposed between said spider and valve element and yieldingly urging said valve element into seating engagement with said valve seat,
 (e) said valve element having an inner surface defining a recess having a generally axially projecting surface portion engaging and confining said yielding means against movement radially relative to said valve element, the convex outer surface being arranged to engage said seat in predetermined angular displacements of said valve element relative to said seat and to project sufficiently into said opening such that the apex portion remains in said opening in all operating positions of the valve element.

3. The structure defined in claim 2 in which said yielding means comprises a coil compression spring, said surface portion of the recess being circular and circumferentially engaging an adjacent one of the radially inner and outer surface portions of the spring.

4. The structure defined in claim 3 in which said spider is disposed to extend radially inwardly of the marginal edge of said body and is formed to provide an axially inturned circumferential flange circumferentially engaging the adjacent end of said spring to confine said spring against movement radially relative to said spider.

5. A capsule-type check valve comprising:
 (a) a generally cup-shaped body adapted to be disposed in a fluid passage and having, a marginal edge, a transverse wall portion axially spaced from said marginal edge, and an axial fluid opening through said transverse wall portion, said transverse wall portion and fluid opening defining a valve seat,
 (b) a cup-shaped valve element disposed within said body and having a convex outer surface portion normally seating against said valve seat to close said opening, and an axially projected apex portion,
 (c) a spider mounted in said body in axially spaced relation to said opening and valve element,
 (d) and a coil compression spring interposed between said spider and valve element and yieldingly urging said valve element into seating engagement with said valve seat,
 (e) said valve element having an inner surface defining an annular groove for reception of the adjacent end convolution of said spring and confining the adjacent end of the spring against movements radially relative to said valve element, the convex outer surface being arranged to engage said seat in predetermined angular displacements of said valve element relative to said seat and to project sufficiently into said opening such that the projected portion remains located in the opening in all operating positions of said valve element.

6. The structure defined in claim 5 in which said spider comprises:
 (a) a central hub portion defining a seat for the adjacent end of said spring,
 (b) and a plurality of circumferentially spaced spokes extending radially outwardly from said hub portion to the marginal edge portion of said body,
 (c) said spokes having axially inturned outer ends snugly engaging inner surface portions of said cup-shaped body and abutting said transverse wall, said inturned ends being of a length to locate said hub portion substantially in the plane of said marginal edge.

7. A capsule-type check valve comprising:
 (a) a cup-shaped member having a seat and an axial fluid opening therethrough and adapted to be mounted in fluid passage,
 (b) a cup-shaped valve element disposed in said member and having an external convex surface normally closing said fluid opening, (c) a spider mounted in said cup-shaped member at the marginal portion thereof, and (d) yielding means interposed between said spider and said valve element yieldingly urging said valve element into seating engagement with said seat, (e) said valve element being spherically curved and having an axially projecting generally cylindrical portion formed to provide concave inner surfaces for seating engagement with said yielding means, said projecting portion being smaller than said axial opening, the outer convex surface of said valve element being arranged to engage said seat in predetermined angular displacement of said valve element relative to said seat and to project sufficiently into said opening such that the projecting portion remains located in the opening in all operating positions of the valve element.

8. A self-aligning, self-seating capsule-type check valve comprising:
(a) a cup-shaped member adapted to be mounted in a fluid passage and having a generally cylindrical wall, a base portion at one end of the cylindrical wall, and an axial fluid opening through said base portion defining a valve seat, (b) a cup-shaped valve element having spherically curved convex outer side portions and a cylindrical axially projecting portion, disposed in said cup-shaped member and normally closing said fluid opening, (c) a spider mounted in the marginal portion of said cup-shaped member, and (d) yielding means interposed between said spider and said valve element yieldingly urging said valve element into seating engagement with said valve seat, (e) said valve element and projecting portion having inner concave surfaces for seating engagement with said yielding means to hold said yielding means against lateral movements relative to said valve element, said projecting portion being smaller than said fluid opening, the outer convex surface of said valve element being arranged to engage said seat in predetermined angular displacements of said valve element relative to said seat and to project sufficiently into said opening such that the projecting portion remains located in the opening in all operating positions of the valve element.

References Cited by the Examiner

UNITED STATES PATENTS

| | | | |
|---|---|---|---|
| 2,311,971 | 2/1943 | Shaw | 137—543.17 X |
| 2,752,942 | 7/1956 | Trevaskis | 137—512.1 |
| 3,084,709 | 4/1963 | Flick et al. | 137—515.3 X |

FOREIGN PATENTS

| | | |
|---|---|---|
| 634,619 | 1/1962 | Canada. |
| 943,751 | 3/1949 | France. |
| 749,532 | 5/1944 | Germany. |

ISADOR WEIL, *Primary Examiner.*

D. LAMBERT, *Assistant Examiner.*